United States Patent [19]

Hayashi

[11] Patent Number: 4,482,310
[45] Date of Patent: Nov. 13, 1984

[54] APPARATUS FOR MANUFACTURING WRAPPED FOOD PRODUCTS

[76] Inventor: Torahiko Hayashi, 3-4, Nozawa-machi, Utsunomiya-shi, Tochigi-ken, Japan

[21] Appl. No.: 451,144
[22] PCT Filed: Apr. 2, 1982
[86] PCT No.: PCT/JP82/00098
§ 371 Date: Dec. 2, 1982
§ 102(e) Date: Dec. 2, 1982
[87] PCT Pub. No.: WO82/03313
PCT Pub. Date: Oct. 14, 1982

[30] Foreign Application Priority Data
Apr. 2, 1981 [JP] Japan .................. 56-50177

[51] Int. Cl.³ ............... A21C 3/04; A21C 11/04
[52] U.S. Cl. .................. 425/132; 425/133.1
[58] Field of Search ......... 425/132, 133.1, 130; 251/209

[56] References Cited
U.S. PATENT DOCUMENTS

| 1,004,578 | 10/1911 | Lauigne | 137/625.3 |
| 2,998,023 | 8/1961 | Campbell et al. | 251/209 |
| 3,806,293 | 4/1974 | Taureck et al. | 425/132 |
| 4,102,357 | 7/1978 | Charlton | 251/209 |
| 4,345,622 | 8/1982 | Henningsson | 251/209 |

Primary Examiner—Willard E. Hoag
Attorney, Agent, or Firm—Guy W. Shoup; Gerard F. Dunne

[57] ABSTRACT

An apparatus for manufacturing food products, such as knoedels, picnic eggs, knish etc., in which core materials are wrapped with crust materials. The apparatus comprises an outside cylindrical assembly and an inside cylindrical assembly, each assembly having a substantially horizontal axis, further comprises an annular passageway for crust materials which is formed between the opposite surfaces of cylindrical body portions of the two assemblies. Each assembly comprises an outer tube and inner tube which are arranged so that the former abuts the latter and they can periodically rotate in the opposite directions about their common axis. The outer and inner tubes of said outside assembly are provided at the respective body portions thereof with inlet and outlet apertures for the crust material. The outer and inner tubes of said inside assembly are provided at the respective body portions thereof with outlet apertures for the crust material. Each of the apertures in the respective assemblies is adapted to periodically take an open position and a closed position due to the rotation of the associate tubes. An inlet or entrance for the core materials is provided at a side end of the inside assembly.

3 Claims, 5 Drawing Figures

4,482,310

APPARATUS FOR MANUFACTURING WRAPPED FOOD PRODUCTS

DESCRIPTION

1. Technical Field

The present invention relates to an apparatus for manufacturing food products, such as knoedels, picnic eggs, knish etc., in which core materials are wrapped with crust materials. The crust materials used in the present invention may or may not be viscous. As for the core materials, any food materials may be processed in the present apparatus so long as they are plastic and can be guided through a pipe.

2. Background Art

The conventional apparatus comprises double cylinders vertically and concentrically positioned and consisting an inside cylinder which allows the core materials to be discharged from the lower end thereof, and an outside cylinder which allows the crust materials to be transported through a passage defined between the inside and outside cylinders and discharged from an annular outlet defined by the lower ends of the inside and outside cylinders.

Shutters are arranged separately from the cylinders or passageways for materials so as to periodically open and close synchronously with each other and the speed of the falling materials continuously supplied from the cylinders so that the materials can be divided into separate masses and simultaneously the masses can be formed to substantially spherical food materials similar to those manufactured by the apparatus of the present invention.

Such prior apparatus, however, has a very complex structure, since the shutters are arranged separately from the cylinders. Also, in the prior apparatus, it is required that flour is supplied to the outer crust materials while they are in contact with the shutters, since the crust material would otherwise adhere to the shutters, so that products of good appearance could not effectively be obtained.

An object of the present invention is to resolve the above difficulties of the prior apparatus, and to provide an apparatus having a simple structure.

Simplification of the apparatus can be attained, unlike the prior apparatus, generally by horizontally positioning both the outside cylindrical assembly and the inside cylindrical assembly, and providing outlet apertures for discharging the crust and core materials at the body portions of the outside and inside assemblies, respectively, dispensing with independent shutters.

Another object of the present invention is to provide a food material manufacturing apparatus with a structure such that it simplifies the synchronization of shutters with cylinders.

Another object of the present invention is to provide a food material manufacturing apparatus for producing wrapped food materials of good appearance without using flour, irrespective of the kind of crust materials.

DISCLOSURE OF INVENTION

According to the present invention, there is provided an apparatus for manufacturing food products in which core materials are wrapped with crust materials, comprising an outside cylindrical assembly and an inside cylindrical assembly, each assembly having a substantially horizontal axis with the inside assembly positioned in the outside assembly positioned in the outside assembly, further comprising an annular passageway for crust materials which is formed between the opposite surfaces of cylindrical body portions of the outside and inside assemblies, each assembly comprising an outer tube and an inner tube which tubes are arranged so that the former abuts the latter and they can cyclically rotate in the opposite directions about their common axis, the outer and inner tubes of said outside assembly being provided at the respective body portions thereof with inlet and outlet apertures for the crust materials, the two outlet apertures being adapted to co-operate with each other, while the outer and inner tubes thereof rotate, so as to periodically take an open position where the apertures are aligned to pass the crust material therethrough and a closed position where the flow of the crust material therethrough is interrupted, the outer and inner tubes of said inside assembly being provided at the respective body portions thereof with outlet apertures for the core material, the two outlet apertures being adapted to co-operate with each other, while the outer and inner tubes thereof rotate, so as to periodically take an open position where the apertures are aligned to pass the core material therethrough and a closed position where the flow of the core material therethrough is interrupted, the outlet apertures in said outside and inside assemblies being positioned in alignment with each other, said open and closed positions of the outlet pertures in said outside and inside assemblies, respectively, being synchronously taken.

It is highly preferable that the two inlet apertures in said outside assembly are adapted to co-operate with each other, while the outer and inner tubes thereof rotate, so as to periodically take an open position where the apertures are alined to pass the crust material therethrough and a closed position where the flow of the crust material therethrough is interrupted, said open and closed positions of the inlet apertures therein being synchronously taken with those of the outlet apertures therein.

Preferably, said inlet and outlet apertures in said outside assembly are positioned at the upper and lower parts, respectively, of the body portion of said outside assembly, said inside assembly being offset in relation to said outside assembly so as to be close to ghe outlet apertures in said outside assembly, whereby the space between said outlet apertures in said inside and outside assemblies can be defined to a desired distance.

According to another feature of the present invention, there is provided an apparatus for manufacturing spherical food products, comprising a cylindrical assembly having a substantially horizontal axis, said assembly comprising an outer tube and an inner tube which tubes are arranged so that the former abuts the latter and they can cylindrically rotate in the opposite directions about their common axis, the outer and inner tubes of said assembly being provided at the respective body portions thereof with outlet apertures for a food material, which are adapted to co-operate with each other, while the tubes thereof rotate, so as to take an open position where the apertures are aligned to pass the food material therethrough and a closed position where the flow of the food material therethrough is interrupted.

BEST MODE OF CARRYING OUT THE INVENTION

In order that the invention may be more clearly understood, the following description is given by way of example only with reference to the accompanying drawings.

Figure 1:
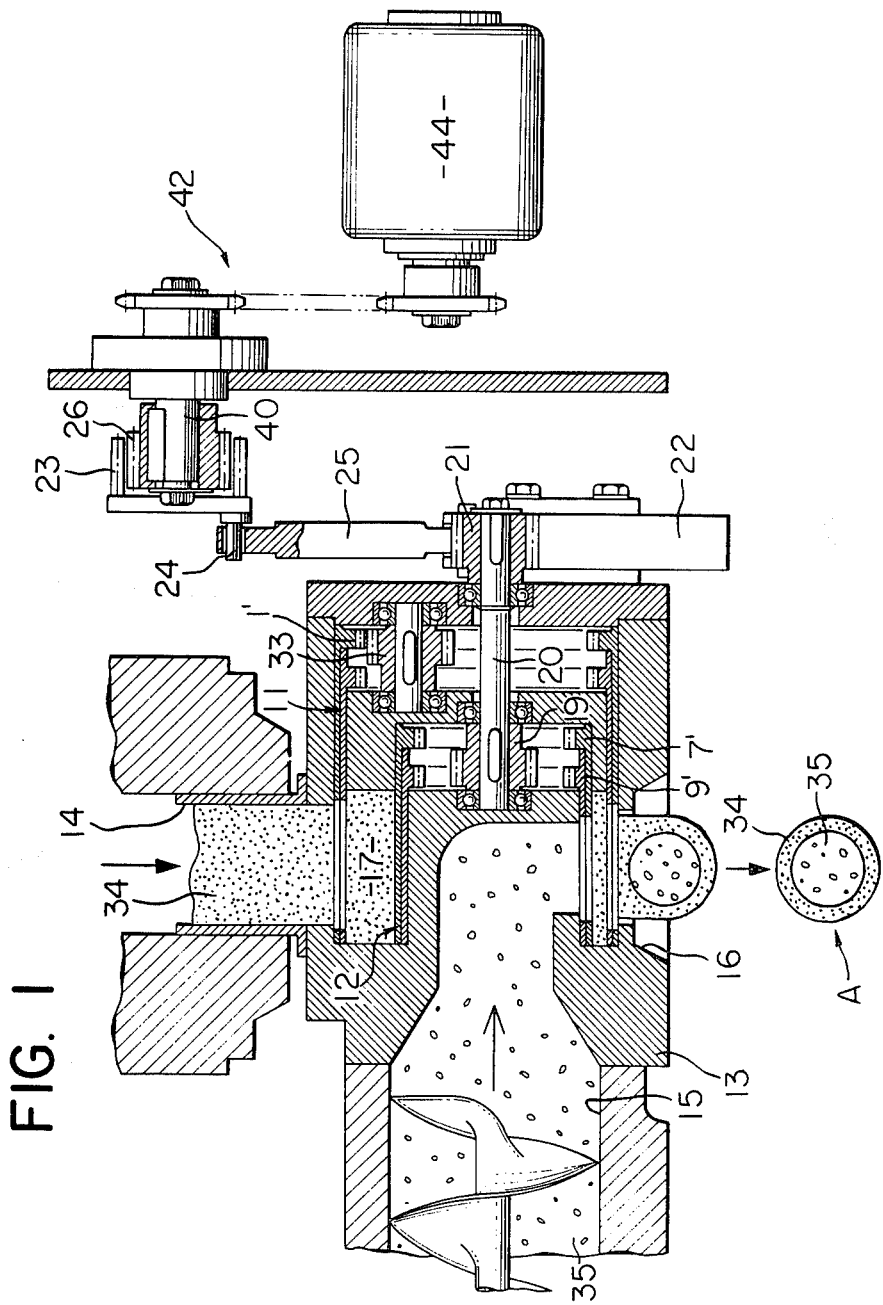
FIG. 1 is a vertical cross-sectional view of an apparatus of the present invention taken along the longitudinal axis thereof.
Figure 2:
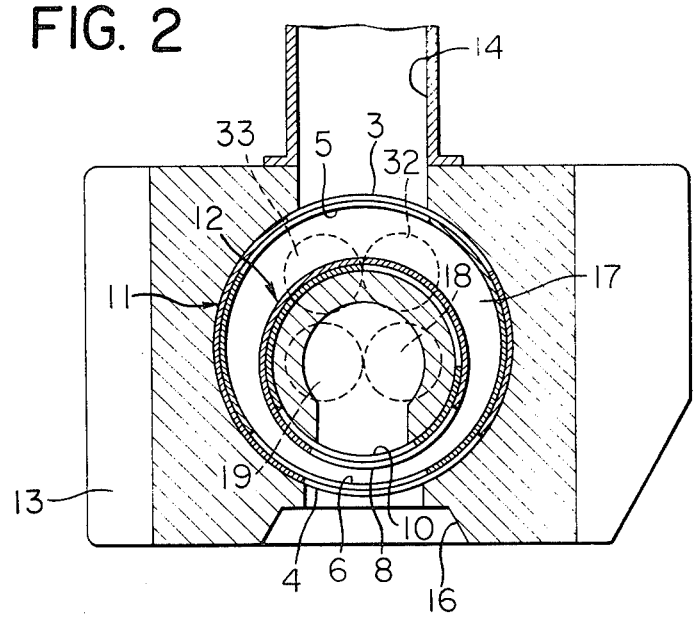
FIG. 2 is a transverse cross-sectional view of the apparatus taken along the vertical center line of an annular passageway for crust materials.
Figure 3:
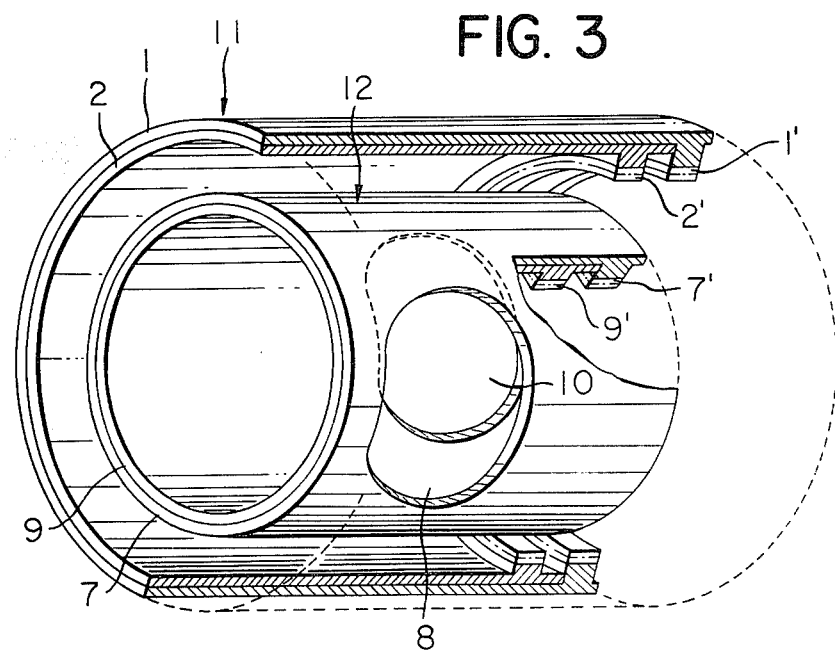
FIG. 3 is a perspective view partly broken away of the outside and inside assemblies as seen from the bottoms thereof.
Figure 4:
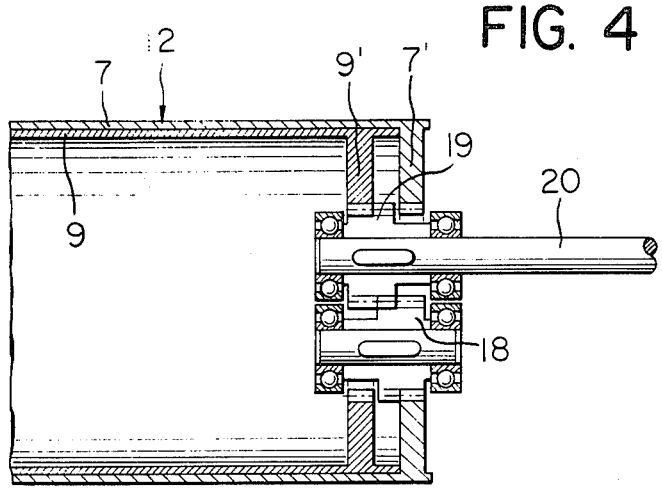
FIG. 4 is an explanatory drawing for showing a gear mechanism which simultaneously rotate the outer and inner tubes of an inside cylindrical assembly in the opposite directions relative to each other.

As shown in FIGS. 1, 2 and 3, the apparatus of the present invention comprises an outside cylindrical assembly (11) and an inside cylindrical assembly (12) both mounted on a frame (13), each of said assemblies having a horizontal axis in parallel relationship with each other.

The outside cylindrical assembly (11) consists of an outer tube (1) and an inner tube (2), the inner surface of the outer tube (1) and the outer surface of the inner tube (2) are arranged so as to abut each other. Both tubes (1), (2) have internal gears (1'), (2'), as shown in the right ends of the tubes in FIG. 1, which are integrally formed along respective inner surfaces of the tubes. The outer and the inner tubes (1), (2) are made to rotate simultaneously in the opposite directions about their common axis. Adjacent to the left ends as seen in FIG. 1 and approximately opposite portions of the body portions of the outer and the inner tubes (1), (2), the tubes are formed with crust material inlet apertures (3), (5), respectively, each having an elliptical configuration which is laterally long relative to the axis of the tube, and crust material outlet apertures (4), (6), respectively, of generally round configuration. Said inlet apertures (3), (5) and said outlet apertures (4), (6) are adapted to co-operate with each other so as to periodically take an open position where the apertures are aligned to pass the crust material therethrough and a closed position where the flow of the crust material therethrough is interrupted, while the outer tube (1) and the inner tube (2) rotate.

Similarly to the outside assembly (11), the inside assembly (12) consists of an outer tube (7) and an inner tube (9), the inner surface of the outer tube (7) and the outer surface of the inner tube (9) are arranged so as to abut each other. Both tubes (7), (9) have internal gears (7'), (9'), as shown in the right ends of the tubes in FIG. 1, which are integrally formed along respective inner surfaces of the tubes. The outer and the inner tubes (7), (9) are made to rotate simultaneously in the opposite directions about their common axis. Adjacent to the left ends as seen in FIG. 1, the body portions of the outer tube (7) and the inner tube (9) are formed with the core material outlet apertures (8), (10), respectively. Said outlet apertures (8), (10) are adapted to co-operate with each other so as to periodically take an open position where the apertures are aligned to pass the core material therethrough and a closed position where the flow of the core material therethrough is interrupted, while the outer tube (7) and the inner tube (9) rotate.

The apparatus of the present invention is provided with an entrance (14) for crust materials (34) leading to inlet apertures (3), (5) for crust materials in the outside cylindrical assembly (11), an entrance (15) for core materials (35) at a side end of the inside cylindrical assembly (12), and a discharge hole (16) for the products, which are to be finally formed into an approximately spherical shape, underneath the outlet apertures (4), (6) for crust materials in the outside cylindrical assembly (11). The entrance (15) communicates with the outlet apertures (8), (10) for core materials in the inside cylindrical assembly (12), and an annular passageway (17) of the crust materials (34) is defined by the outside cylindrical assembly (11), the inside cylindrical assembly (12) and the frame (13).

In FIG. (4) illustrating a driving mechanism of the outer tube (7) and the inner tube (9) in the inside cylindrical assembly (12), a pinion (18) and a pinion (19) mesh with an internal gear (7') and an inernal gear (9'), respectively, while the pinions (18) and (19) mesh with each other.

As shown in FIG. 1, a shaft (20) of the pinion (19) is fixed to a pinion (21) at an end thereof. As clearly shown in FIGS. 1 and 5, the pinion (21) meshes with a rack (22), and a pin (22') fixed to one end of the rack (22) is operatively connected by a connecting shaft (25) to a crank pin (24) fixed to a crankshaft gear (23) at its peripheral portion. The crankshaft gear (23) meshes with a power gear (26), a shaft (40) of which gear (26) is rotated in a fixed direction by a motor (44) via a pulley device (42).

It will be easily understood from the above description that the rack (22) is moved back and forth thereby to periodically rotate the outer tube (7) and inner tube (9) of the inside cylindrical assembly (12) in the opposite directions relative to each other, so that the outlet apertures (8) and (10) co-operate with each other so as to periodically take an open position and a closed position.

Figure 5:
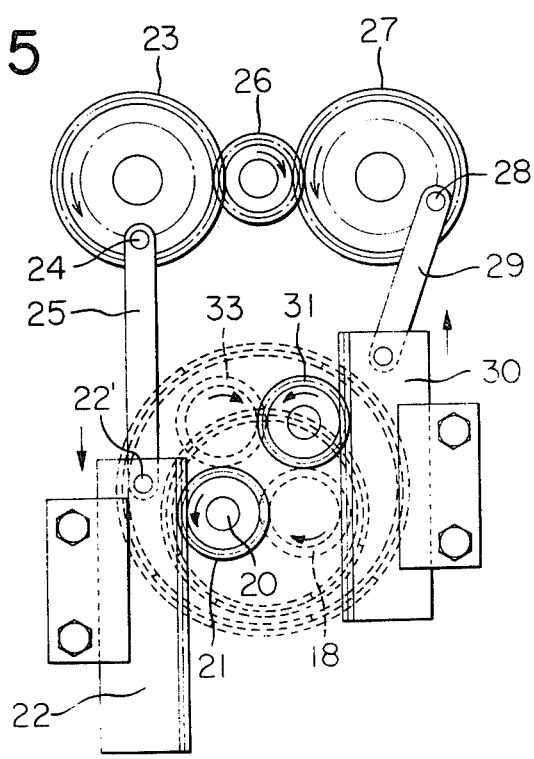
FIG. 5 is an explanatory drawing of a power transmission mechanism for driving the outer and inner tubes of each of the outside and inside assemblies.

As shown in FIG. 5, the power gear (26) meshes with another crankshaft gear (27), and a rack (30) can be moved back and forth through a crank pin (28) and a connecting shaft (29) in the same manner as mentioned above. The rack (30) meshes with a pinion (31), and a pinion (32) fixed to an end of the shaft of the pinion (31) meshes with a pinion (33) (FIGS. 2 and 5). As shown in FIG. 1, the pinion (33) meshes with the internal gear (1') of the outer tube (1) of the outside cylindrical assembly (11). The pinion (32) meshes with the internal gear (2') of the inner tube (2) of the outside cylindrical assembly (11) (not shown).

It will be easily understood from the above description that the rack (30) is moved back and forth thereby to periodically rotate the outer tube (1) and inner tube (2) of the outside cylindrical assembly (11) in the opposite directions relative to each other, so that the inlet apertures (3) and (5) and the outlet apertures (4) and (6), respectively, co-operate with each other so as to periodically take an open position and a closed position, such operations of the inlet and outlet apertures being carried out synchronously.

In operation, the core material (35) is fed under pressure from the side entrance (15) of the inside cylindrical assembly (12) to the apparatus by means of a screw or the like; passed through the outlet apertures (8), (10) of the inside cylindrical assembly (12), the lower portion of the annular passageway (17) and the outlet apertures (4), (6) of the outside cylindrical assembly (11); and then pushed out of the present apparatus through the discharge hole (16). Since the outlet apertures (8), (10) are adapted to co-operate with each other so as to periodically take the open position where the core material is allowed to pass therethrough and the closed position where the core material is prevented from passing therethrough, as already mentioned above, when the core material (35) is passed through the outlet apertures (8), (10), it is cut to form individual masses of a certain bulk by the movement of the outlet apertures (8), (10).

The crust material (34) is continuously fed under pressure onto the upper portion of the outside cylindrical assembly (11) through the entrance (14) by means of a suitable pressure device; passed through the inlet apertures (3), (5) in the outside cylindrical assembly (11); advanced downwards of the annular passageway (17) therealong; passed through the outlet apertures (4), (6); and then pushed out of the present apparatus through the discharge hole (16). Since the outlet apertures (4), (6) are adapted to co-operate with each other so as to periodically take the open position where the crust material is allowed to pass therethrough and the closed position where the crust material is prevented from passing therethrough, as already mentioned above, when the crust material (34) is passed through the outlet apertures (4), (6), it is cut to individual pieces of a certain volume by the movement of the outlet apertures (4), (6).

Specifically, when the outlet apertures (4), (6) in the outside assembly (11) and the outlet apertures (8), (10) in the inside assembly (12) are both in the closed position, the leading portion of the crust material (34) continuously fed under pressure through the entrance (14) for the crust material, is at a portion of the annular passageway (17) between the outlet apertures (4), (6) and (8), (10), while the leading portion of the core material (35) continuously fed under pressure through the entrance (15) for the core material, is on the closed outlet apertures (8), (10). Hereupon, when the outlet apertures (4), (6) in the outside cylindrical assembly (11) are made to take the open position, the leading portion of the crust material (34) advanced to said annular passageway portion can pass through the outlet apertures (4), (6).

Then, when the outlet apertures (8), (10) in the inside cylindrical assembly (12) are made to take the open position, the leading portion of the core material (34) advanced onto the outlet apertures (8), (10) can pass through not only the outlet apertures (8), (10) but also the outlet apertures (4), (6), and rides on the central part of the leading portion of the crust material.

Next, when the outlet apertures (8), (10) in the inside cylindrical assembly (12) are made to take the closed position to cut the core material to make it form a separate mass, while the outlet apertures (4), (6) in the outside cylindrical assembly (11) are still in the open position, a portion of the crust material comes to cover the upper area of the cut core material, whereby the crust material completely wraps the core material therein.

Finally, when the outlet apertures (4), (6) in the outside cylindrical assembly (11) are made to take the closed position after a substantial portion of the wrapped material has cleared the apertures (4), (6), a portion of the crust material now covering the upper area of the core material is separated from the remainder, whereby the generally spherical product (A) shown in FIG. 1 is formed and drops passing through the discharge hole (16).

When the upper area of the product is gradually formed by the crust material, the outlet apertures (4), (6) in the outside assembly (11) approach its closed position, a space defined by the outlet apertures (4), (6), which space allows the crust material to pass therethrough, being gradually reduced. In general, a fluid under constant pressure passes at a faster rate of flow through a hole as the hole becomes narrower. Therefore, when the above space is reduced as above, if a portion of the crust material present adjacent the reduced space were subjected to a constant pressure, the speed of the crust material which is to be passed through the reduced spaced would increase, and therefore a portion of the crust material at the upper area of the product (A) would have a tendency to become excessively thick in comparison with the thickness of the remaining crust material of the product, so that a product having an even thickness of crust material could not be obtained.

To avoid this, it is desirable that the inlet apertures (3), (5) are adapted to be closed at the same time as the outlet apertures (4), (6) in the outside assembly (11) are closed. At that time, the pressure to which the crust material is subjected, is gradually reduced as the crust material advances from the inlet apertures (3), (5) through the annular passageway (17) toward the outlet apertures (4), (6). As the result, the rate of flow, and therefore the amount, of the crust material to be passed through the outlet apertures (4), (6), can be reduced, whereby the crust material at the upper area of the product (A) can be prevented from becoming too thick.

In the embodiment of the present invention described above, the outlet apertures (4), (6) in the outside assembly (11) and the outlet apertures (8), (9) in the inside assembly (12) were described as being operated according to the following order:

1. outlet apertures (4), (6) are opened
2. outlet apertures (8), (9) are opened
3. outlet apertures (8), (9) are closed
4. outlet apertures (4), (6) are closed Operation steps 1 and 2 of the outlet apertures (4), (6) and (8), (9), however, may be reversed. Also, operation steps 1 and 2 may be carried out at the same time.

As clearly shown in FIGS. 1 and 2, it is preferable that the axes of the outside cylindrical assembly (11) and the inside cylindrical assembly (12) are offset with respect to each other so that the outlet apertures (4), (6) in the outside assembly (11) are spaced from the outlet apertures (8), (10) in the inside assembly (12) by a predetermined distance, whereby the crust material first passed through the outlet apertures (4), (6) can be pushed out as a relatively thin layer of crust material.

I claim:

1. An apparatus for manufacturing food products in which core materials are wrapped with crust materials, comprising an outside cylindrical assembly and an inside cylindrical assembly, each assembly having a substantially horizontal axis with the inside assembly positioned in the outside assembly, further comprising an annular passageway for crust materials which is formed between the opposite surfaces of cylindrical body portions of the outside and inside assemblies, each assembly comprising an outer tube and an inner tube which tubes are arranged so that the former abuts the latter and they can cyclically rotate in the opposite directions about their common axis, the outer and inner tubes of said outside assembly being provided at the respective body portions thereof with inlet and outlet apertures for the crust material, the two outlet apertures being adapted to co-operate with each other, while the outer and inner tubes thereof rotate, so as to periodically take an open position where the apertures are aligned to pass the crust material therethrough and a closed position where the flow of the crust material therethrough is interrupted, the outer and inner tubes of said inside assembly being provided at the respective body portions thereof with outlet apertures for the core material, the two outlet apertures being adapted to co-operate with each other, while the outer and inner tubes thereof rotate, so as to periodically take an open position where the apertures are aligned to pass the core material therethrough and a closed position where the flow of the core material therethrough is interrupted, the outlet apertures in said outside and inside assemblies being positioned in alignment with each other, said open and closed positions of the outlet apertures in said outside and inside assemblies, respectively, being synchronously taken.

2. An apparatus according to claim 1, characterized in that the two inlet apertures in said outside assembly are adapted to co-operate with each other, while the outer and inner tubes thereof rotate, so as to periodically take an open position where the apertures are aligned to pass the crust material therethrough and a closed position where the flow of the crust material therethrough is interrupted, said open and closed positions of the inlet apertures therein being synchronously taken with those of the outlet apertures therein.

3. An apparatus according to claim 1 or 2, characterized in that said inlet and outlet apertures in said outside assembly are positioned at the upper and lower parts, respectively, of the body portion of said outside assembly, said inside assembly being offset in relation to said outside assembly so as to be close to the outlet apertures in said outside assembly, whereby the space between said outlet apertures in said inside and outside assemblies can be defined to a desired distance.

* * * * *